United States Patent
Choi et al.

(10) Patent No.: US 7,764,331 B2
(45) Date of Patent: Jul. 27, 2010

(54) LIQUID CRYSTAL DISPLAY WITH THE FRAME HAVING CHAMFER

(75) Inventors: Seong-sik Choi, Seoul (KR); Jae-hwan Chun, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 354 days.

(21) Appl. No.: 11/451,776

(22) Filed: Jun. 12, 2006

(65) Prior Publication Data

US 2006/0279536 A1  Dec. 14, 2006

(30) Foreign Application Priority Data

Jun. 13, 2005  (KR)  ...................... 10-2005-0050439

(51) Int. Cl.
*G02F 1/1333* (2006.01)
*G06F 1/16* (2006.01)

(52) U.S. Cl. ............... 349/58; 361/679.04; 361/679.05; 361/679.06; 361/679.21; 361/679.27

(58) Field of Classification Search .................. 349/58; 361/142, 614, 679.02, 714, 724, 730, 752, 361/796

See application file for complete search history.

(56) References Cited

U.S. PATENT DOCUMENTS 4,561,783 A * 12/1985 Lederrey .................... 368/309
5,438,482 A * 8/1995 Nakamura et al. .......... 361/816
6,361,867 B2 * 3/2002 Kishida et al. .............. 428/428
6,411,359 B1 * 6/2002 Kobayashi et al. .......... 349/149
6,977,694 B2 * 12/2005 Natsuyama .................. 349/60
2006/0126438 A1 * 6/2006 Itou et al. .................... 368/47

FOREIGN PATENT DOCUMENTS

| JP | 08-179288 | 7/1996 |
|---|---|---|
| KR | 10-0402393 | 2/2002 |
| KR | 10-2004-44661 | 5/2004 |

OTHER PUBLICATIONS

Patent Abstracts of Japan, Publication No. 08-179288, Jul. 12, 1996, 1 p.
Korean Patent Abstracts, Publication No. 10-0402393, Feb. 1, 2002, 1 p.
Korean Patent Abstracts, Publication No. 10-2004-44661, May 31, 2004, 1 p.

* cited by examiner

*Primary Examiner*—Hoan C Nguyen
(74) *Attorney, Agent, or Firm*—Innovation Counsel LLP

(57) ABSTRACT

An LCD including an LCD panel and a frame having a front frame portion providing a display window exposing a display area of the LCD panel. The frame includes a side frame portion and a chamfer portion intermediate the front and side frame portions.

10 Claims, 4 Drawing Sheets

LIQUID CRYSTAL DISPLAY WITH THE FRAME HAVING CHAMFER

CROSS-REFERENCE TO RELATED APPLICATIONS

This application claims the benefit of priority from Korean Patent Application No. 2005-0050439, filed on Jun. 13, 2005, in the Korean Intellectual Property Office, the disclosure of which is incorporated herein by reference in its entirety.

BACKGROUND OF THE INVENTION

1. Field of the Invention

The present invention relates to a liquid crystal display, and more particularly, to a liquid crystal display having increased protection from damage resulting from an external physical impact.

2. Description of the Related Art

In general, a liquid crystal display ("LCD") is a device for displaying an image, using pixels including liquid crystal cells aligned in a matrix form. The light transmittance of the pixel cells is adjusted in response to an image signal. The LCD forms an image on an LCD panel typically through the use of light from a backlight unit.

The LCD comprises an LCD panel on which liquid crystal cells formed in pixel units which are aligned in a matrix. Additionally, driving circuitry is provided for the liquid crystal cells, along with a backlight unit which uniformly provides light to the LCD panel. A container is provided for the above and a support member which exposes a display area cooperates with the container. The frame typically comprises a front frame portion which is disposed along the edge of the LCD panel so that the display area is exposed. A side frame portion extends from the front frame portion to the lateral side of the LCD panel. The support member protects the LCD from external impact and stably supports the LCD panel.

As the LCD becomes larger, slimmer and lighter, fewer attachment components such as screws are used to decrease fabrication time, thus enhancing productivity and reducing manufacturing costs.

However, if fewer attachment components are used, the support member will not stably support the components of the LCD and adequately protect the components inside the LCD from damage resulting from external impacts. More particularly, as the LCD becomes larger, slimmer and lighter, the support member is more easily bent by external impacts, and the LCD is not adequately protected.

SUMMARY OF THE INVENTION

Accordingly, it is an aspect of the present invention to provide a liquid crystal display having increased resistance to damage from external impacts.

The foregoing and other aspects of the present invention are achieved by providing an LCD comprising an LCD panel; and a support structure for the LCD panel, the support structure comprising: an LCD panel; and a support structure for the LCD panel, the support structure comprising: a frame extending around a perimeter of the LCD panel, the frame having a display window exposing a display area of the LCD panel, wherein the frame comprises a front frame portion positioned in a first plane, a side frame portion positioned in a second plane and a chamfer portion positioned in a third plane and being positioned intermediate the front and side frame portions.

According to the embodiment of the present invention, a ratio of a width of the chamfer portion to a length of a side of the LCD panel is in a range of 0.002 to 0.01.

According to the embodiment of the present invention, the width of the chamfer is in a range of 2 mm to 6 mm.

According to the embodiment of the present invention, an angle between the front frame and the chamfer is in a range of 120 degrees to 150 degrees.

According to the embodiment of the present invention, the fixing member is made of an alloy of aluminum.

According to the embodiment of the present invention, the LCD further comprises an accommodating container accommodating a backlight unit, wherein the fixing member is combined with the accommodating container.

BRIEF DESCRIPTION OF THE DRAWINGS

The above and other aspects and advantages of the present invention will become apparent and more readily appreciated from the following description of the exemplary embodiments, taken in conjunction with the accompanying drawings of which.

DETAILED DESCRIPTION OF THE PREFERRED EMBODIMENT

Figure 1:
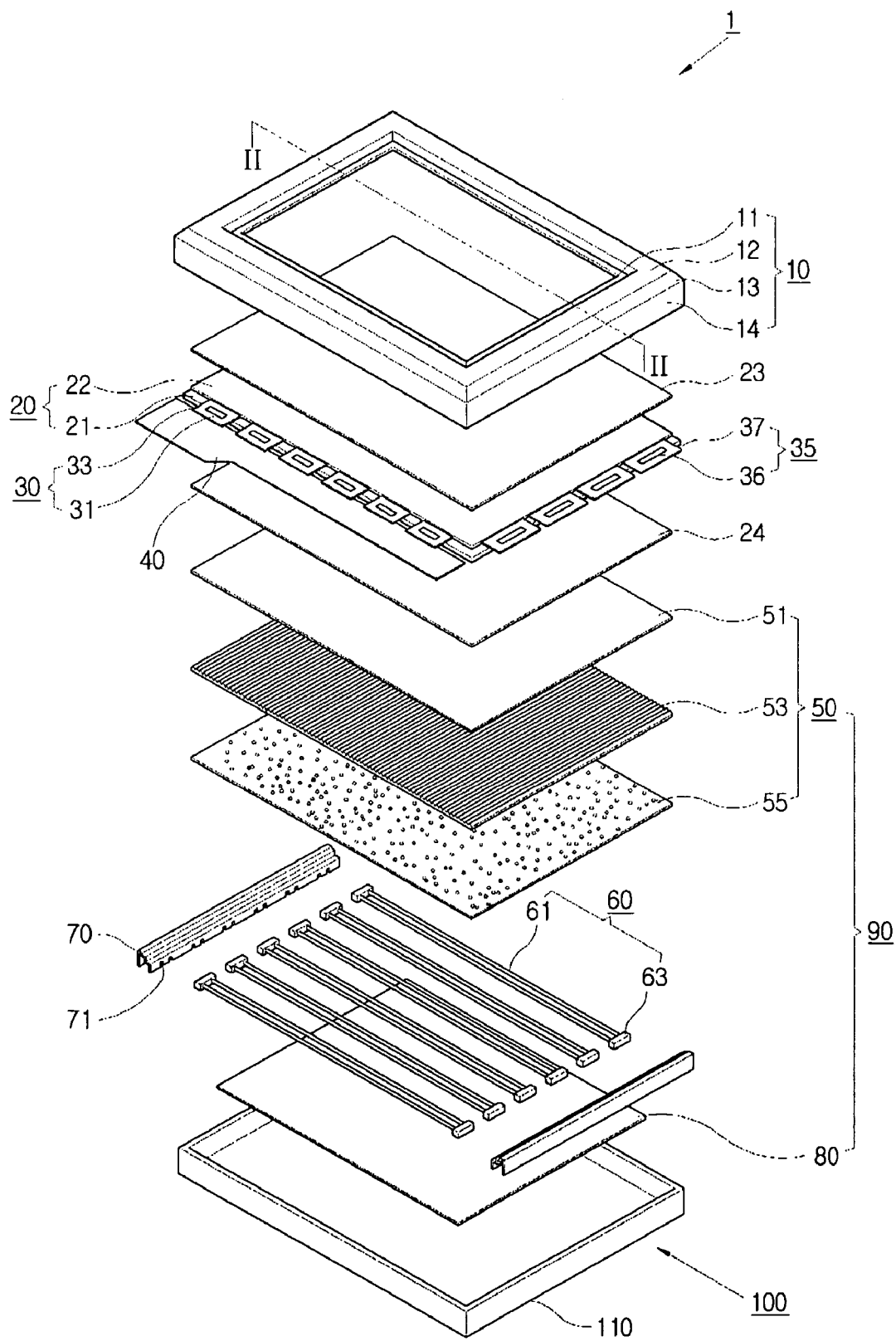
FIG. 1 is an exploded perspective view of an LCD according to an embodiment of the present invention.

Reference will now be made in detail to exemplary embodiments of the present invention, examples of which are illustrated in the accompanying drawings, wherein like reference numerals refer to like elements throughout. The embodiments are described below in order to explain the present invention by referring to the figures.

In an embodiment, a direct type will be described as an example of a backlight unit.

Figure 2:
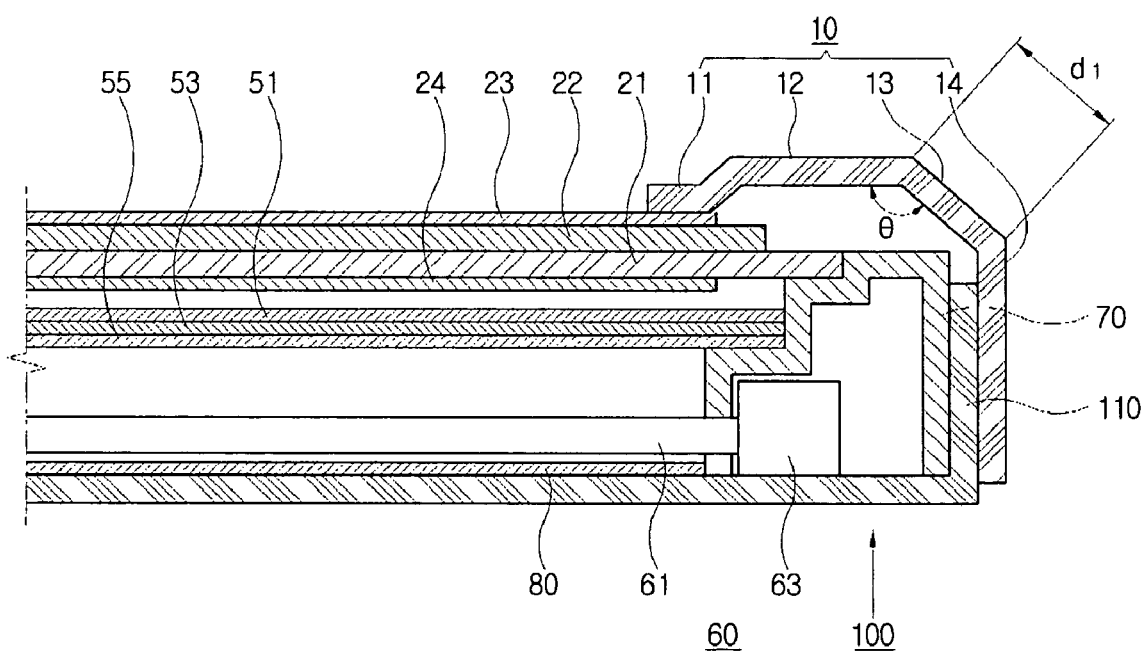
FIG. 2 is a sectional view taken along line 2-2 of FIG. 1.

FIG. 1 is an exploded perspective view of an LCD and FIG. 2 is a sectional view of the LCD according to the embodiment of the present invention.

LCD 1 is comprised of an LCD panel 20 on which an image is formed, a gate driving part 30 and a data driving part 35 which drive the LCD panel 20, a backlight unit 90 which radiates light to a rear of the LCD panel 20, a container 100 which supports and encloses the backlight unit 90, and frame 10, which cooperates with container 100, to cover the front surface of the LCD panel 20.

The LCD panel 20 comprises a Thin Film Transistor (TFT) substrate 21, a color filter substrate 22 disposed face to the TFT substrate 21 and a liquid crystal (not shown) interposed between the two substrates. Also, the LCD panel 20 further comprises polarizers 23 and 24 respectively which are adhered on a front surface of the color filter substrate 22 and on a rear surface of the TFT substrate 21 so that light passing through the LCD panel 20 is cross polarized. On the LCD panel 20, there are aligned liquid crystal cells formed in a pixel unit and aligned in a matrix form. The liquid crystal cells form an image by adjusting the light transmittance through the liquid crystal cells according to an image signal transmitted from the driving part 30 and 35.

A plurality of gate lines and a plurality of data lines are formed on the TFT substrate 21 in a matrix form and a TFT is formed at the intersection of the gate lines and the data lines. A signal voltage transmitted from the driving part 30 and 35 is applied between a pixel electrode and a common electrode of the color filter substrate 22 through the TFT. Under the control of the TFT, the liquid crystal between the pixel electrode and the common electrode is aligned by the signal voltage, thereby determining light transmittance.

The color filter substrate 22 comprises a color filter on which a red, a green and a blue or a cyan, a magenta and a yellow color filters are repeatedly formed on the boundary of a black matrix and a common electrode. The common electrode is typically comprised of transparent conductive substance such as ITO (Indium Tin Oxide), or IZO (Indium Zinc Oxide). The color filter substrate 22 has a smaller area than the TFT substrate 21.

The gate driving part 30 comprises a gate driving chip 31 to apply a gate driving signal and an Flexible Printed Circuit (FPC) 33 on which the gate driving chip 31 is mounted using a COF (Chip On Film) method. On the FPC, there are disposed the gate driving chip 31 and a circuit pattern connected to a gate pad, which is an end part of the gate line of the TFT substrate 21. The gate driving part 30 extends to the lateral side of the LCD panel 20 while being bent at approximately 90 degrees due to assembling the frame 10. The gate driving part 30 applies the gate driving signal comprised of a gate-on voltage (Von) and a gate-off voltage (Voff) from a driving circuit part 40 connected to the data driving part 35 respectively to the gate lines.

The data driving part 35 comprises a data driving chip 36 to apply a data driving signal and an FPC 37 on which the data driving chip 36 is mounted using a COF method and of which one side is connected to an end of the data line on the TFT substrate 21. Another side of the FPC 37 is connected to the driving circuit part 40 controlling the gate driving chip 31 and the data driving chip 36. The data driving part 35 extends to the lateral side of the LCD panel 20 and the driving circuit part 40 is disposed in rear of the accommodating container 100. The data driving part 35 is provided with a Gray scale voltage from a Gray scale voltage generator (not shown), which selects the Gray scale voltage based on a signal from the signal controller, and then applies the data driving signal to the data line.

The liquid crystal disposed between the TFT substrate 21 and the color filter substrate 22 is applied with the gate driving signal and the data driving signal from the gate driving part 30 and the data driving part 35 and is realigned accordingly.

The backlight unit 90 which is disposed in rear of the LCD panel 20 comprises optical sheet assembly 50, a lamp unit 60 and a reflective sheet 80.

The optical sheet assembly 50 comprises a protection sheet 51 disposed in rear of the LCD panel 20, a prism sheet 53 and a diffusion sheet 55. The diffusion sheet 55 is comprised of a base plate and a coating layer having beads formed on the base plate. The diffusion sheet 55 diffuses light from the lamp 61 to provide it to the LCD panel 20. Two or more overlapping sheets like diffusion sheet 55 may be used. Prism sheet 53 includes a plurality of triangularly-shaped prisms at a predetermined alignment. The prism sheet 53 concentrates light diffused from the diffusion sheet 55 in a direction which is perpendicular to the plane of the surface of the LCD panel 20. Typically, the prism sheet 53 consists of two sheets each of which includes micro prisms formed on the each prism sheet, with the prisms being positioned at a predetermined angle with each other. The light passing through the prism sheet 53 progresses vertically to provide a uniform brightness to the LCD panel. The protection sheet 51, disposed on the top, protects the prism sheet 53 which is vulnerable to scratching.

The lamp unit 60 is comprised of a lamp portion 61 which radiates light, a lamp electrode (not shown) formed at the end of the lamp 61 and a lamp holder 63 in which the end of the lamp 61 is inserted. The lamp unit 60 is driven by being supplied with electric power from an inverter (not shown). A plurality of lamp units 60 are disposed in parallel over the entire rear of the LCD panel 20. A plurality of lamps 61 are inserted in the lamp holder 63 in a pair. The lamp holder 63 supports the lamp 61 and is accommodated in a side mold 70.

In the embodiment of the present invention, a Cold Cathode Fluorescent Lamp (CCFL) is used as a light source. Alternatively, External Electrode Fluorescent Lamp (EEFL) may be used. EEFLs provide a brighter light, cost less and consume less power than CCFLs, and is capable of driving a plurality of lamp units 60 with one inverter (not shown).

Referring to FIGS. 1 and 2, it will be appreciated that side support 70 is stair-shaped and hollow. First and second side supports 70 are disposed at opposite lateral sides of the container 100. Side support 70 includes a groove 71 in which the lamp holder 63 is inserted when the lamp 61 is combined with the groove 71. A first stair of the side support 70 supports an edge of the optical sheets 50 and the second stair of the side support 70 supports the edge of the LCD panel 20. Thus, LCD panel 20 is spaced apart from the lamp units 60 by the side support 70.

The reflective sheet 80, disposed between the lamp 61 and the container 100, reflects light from the lamp 61 and directs it toward diffusion sheet 55. The reflective sheet 80 is made of PET (Polyethylene terephthalate) or PC (Polycarbonate).

Frame 10 is comprised of a front frame portion 12 which terminates in lip 11 which exposes a display area of the LCD panel 20. Side frame portion 14 extends downwardly from chamfer portion 13 which extends from front frame portion 12. Thus, frame 10 includes the chamfer portion 13 which is bent from the front frame portion 12 at a predetermined slant angle indicated by the Greek letter $\theta$ and shown in FIG. 2. Side frame portion 14 extends from the chamfer portion 13 to the lateral side of the LCD panel 20 and side frame portion 14 cooperates with the container 100. The front frame portion 12 is disposed along the edge of the LCD panel 20 so that the display area of the LCD panel 20 is exposed to the outside and the side frame 14 cooperates with the upwardly extending wall 110 of container 100. Frame 10 may be constructed of aluminum.

As shown in FIG. 2, and indicated by angle $\theta$, chamfer 13 slants at approximately 120~150 degrees from the front frame 12. The ratio between the width d1 of the chamfer portion 13 and the longer side of the LCD panel 20 should preferably be maintained in a range of 0.002 to 0.01. Providing chamfer 13 along with front frame portion 12 and side frame portion 14 serves to protect the components inside the LCD 1 from the external impact without interfering with the components.

The container 100 encloses and supports the backlight unit 90 and is combined with the frame member 10.

Figure 3:
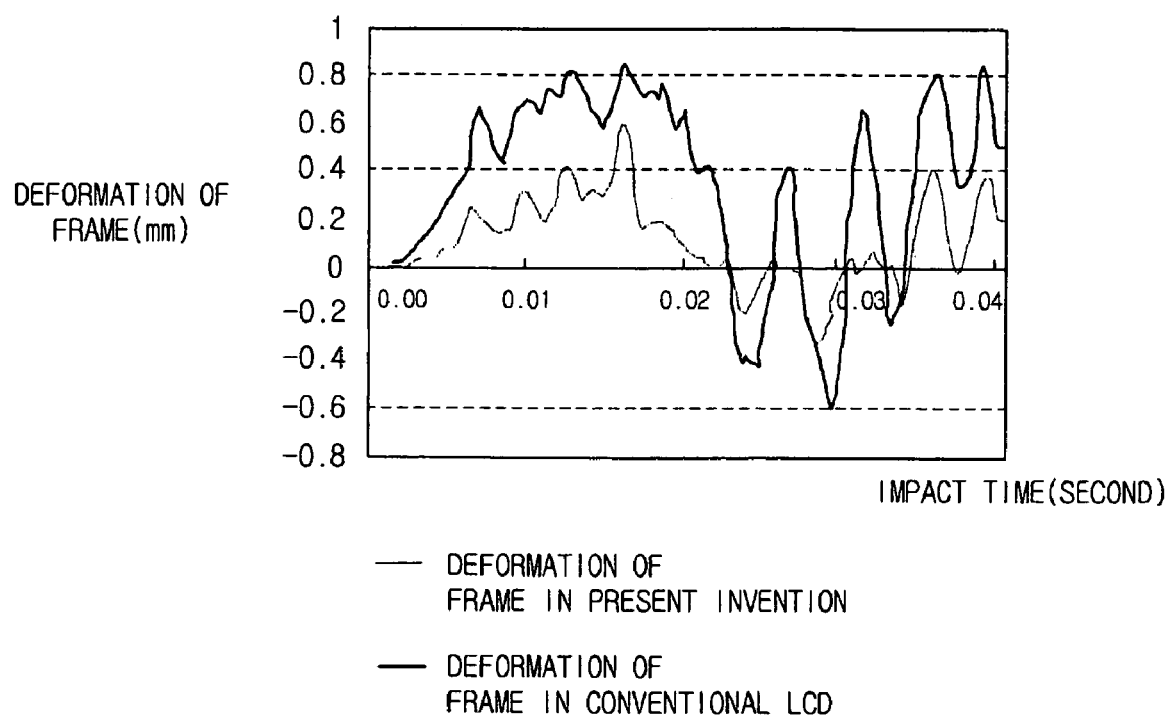
FIG. 3 is a graph showing deformation in millimeters as a function of time of a conventional frame and a frame according to the present invention.
Figure 4:
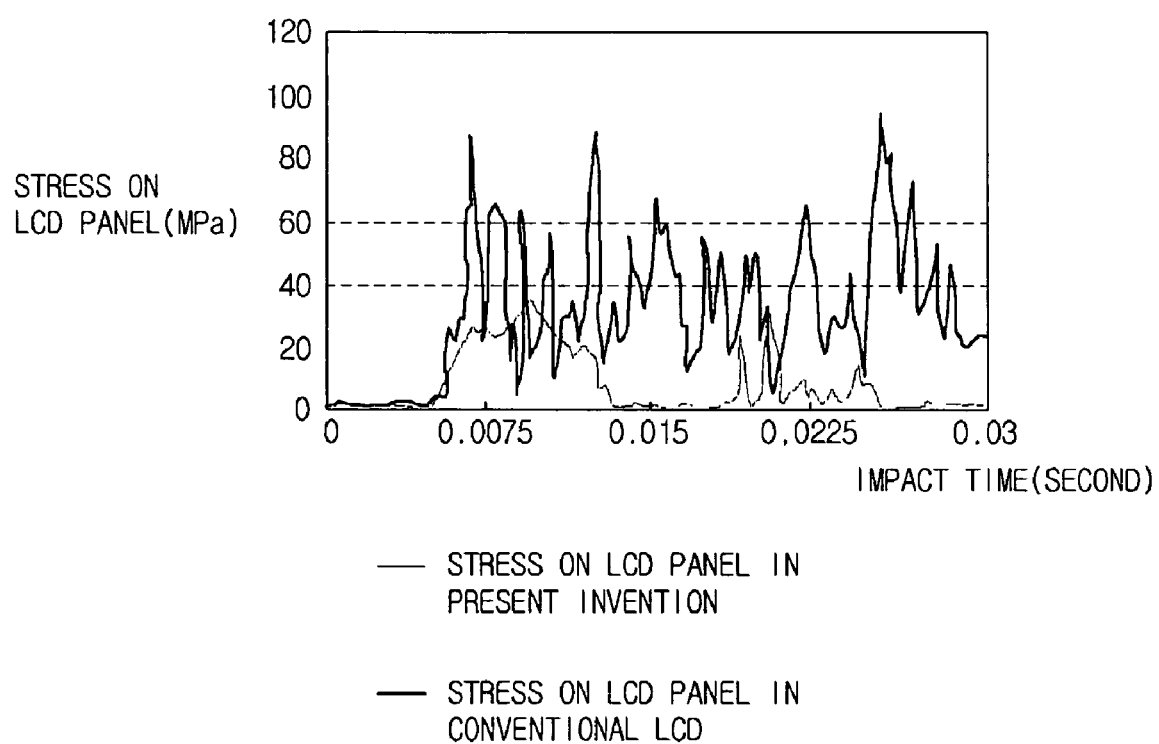
FIG. 4 is a graph showing stress of a conventional LCD panel and an LCD panel according to the present invention against the external impact as a function of time.

FIGS. 3 and 4 are simulated graphs showing deformation of the frame 10 and stress on the LCD panel 20 resulting from an impact in comparison to a conventional LCD without the chamfer, and an LCD with the 4 mm-wide chamfer. A 40-inch TV was used in the simulation.

The frame 10 may be viewed as a plurality of integrated plates of different sizes. Resistance of each plate to external impact, which specially resists bending, is expressed as second moment of an area, that is inertial moment.

The second moment of an area is a value showing that the resistance to bending according to a shape of cross section varies despite the same material and the same cross section area. The larger the second moment of an area is, the higher the resistance to bending, therefore the plates with high resistance may be more stable material.

The first moment of an area is a force generated when material having a micro area is pressurized and is expressed as (distance from standard axis)*(area of cross section).

$$Gx = \int y\, dA$$

Further, the second moment of area (or moment of inertia) is expressed as (distance from standard axis)^2* (area of cross section), and the value corresponds to the sum of values of the first moment of an area.

$$Ix = \int y^2\, dA$$

With regard to the cross section of a member operated on by an external impact, the stress is proportional to a distance from an axis of the center of gravity. Therefore the stress, a force generated in material when a strength is given the material, is expressed as follows.

$$\text{Stress} = \frac{\text{Action moment} * \text{Distance}}{\text{Second moment of area}}$$

Accordingly, if the second moment of the area is large, which makes the stress low, thereby showing that the resistance of the material against the external impact is high and flexural rigidity and stability of the material is high, as well.

In the aforementioned respect, when a force of 50 times that of gravity is applied to a frame of a 40-inch LCD for 11 seconds, the deformation of the frame and the stress to the LCD panel 20 in a conventional LCD without a chamfer and the LCD 100 with chamfer 13 having a dimension d1 of 4 mm the comparison thereof is described below.

As shown in FIG. 3, the deformation of a conventional frame without a chamfer such as 13 of frame 10, is larger than the deformation of the frame 10 which includes the chamfer 13. Numerically, the maximum deformation of frame 10 with the chamfer 13 is reduced about 28.2% as compared with the maximum deformation of a conventional frame. This illustrates the improved resistance and the flexural strength of frame 10 with the chamfer 13 against the external impact increase.

As shown in FIG. 4, the stress on a conventional LCD panel without a chamfer is larger over time than the stress on the LCD panel 20 with the chamfer 13. Numerically, the maximum stress on LCD panel 20 with the chamfer 13 is reduced about 62% as compared with the maximum stress on a conventional LCD panel without a chamfer. This shows that frame 10 with the chamfer 13 efficiently protects and supports components inside the LCD 1 from external impacts.

For a 40-inch, diagonally measured, LCD 1, a width d1 of the chamfer 13 is preferably 2 mm~6 mm. If the chamfer 13 is 2 mm or less in the width, there is no difference when the chamfer 13 does not exist. It has been observed that when chamfer 13 is 6 mm in the width, frame 10 efficiently protects and supports the components, but does not interfere with the components.

The deformation of a conventional frame and frame 10 when the force corresponding to 50 times of gravity is applied to frame 10 for 11 seconds, is: (i) conventional if the chamfer 13 does not exist and (ii) frame 10 with the chamfer 13 of 2 mm and (iii) frame 10 with the chamfer of 4 mm in the width, respectively. The deformation of the fixing member 10 is as follows: (i) 3 mm for frame without a chamfer; (ii) 2.5 mm when member 10 has a 2 mm-width chamfer 13; and (iii) 2.18 mm when frame 10 has a 4 mm-width chamfer 13. Numerically, the deformation of frame 10 with the 2 mm-width chamfer 13 is decreased about 17% as compared with the deformation of a conventional frame without a chamfer; and the deformation of frame 10 with the 4 mm-width chamfer 13 is decreased about 27% as compared with the deformation of a conventional frame without a chamfer. Likewise, it is preferable that the width d1 of the chamfer 13 is wide enough not to interfere with the components inside the LCD 1.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A liquid crystal display (LCD) comprising:
an LCD panel; and
a support structure for the LCD panel, the support structure comprising: a frame extending around a perimeter of the LCD panel, the frame having a display window exposing a display area of the LCD panel, wherein the frame comprises a front frame portion positioned in a first plane, a side frame portion positioned in a second plane, and a chamfer portion positioned in a third plane and being positioned intermediate the front and side frame portions, wherein a ratio of a width of the chamfer portion to a length of a side of the LCD panel is in a range of 0.002 to 0.01.

2. The LCD of claim 1, wherein an angle between the first plane of the front frame portion and the third plane of the chamfer portion is in a range of 120 degrees to 150 degrees.

3. The LCD of claim 1, wherein the frame is comprised of an alloy of aluminum.

4. The LCD of claim 1, further comprising an accommodating container accommodating a backlight unit, wherein the frame cooperates with the accommodating container.

5. The LCD of claim 1, wherein the width of the chamfer portion is in a range of 2 mm to 6 mm.

6. A liquid crystal display (LCD) comprising:
an LCD panel; and
a support structure for the LCD panel, the support structure comprising: a frame extending around a perimeter of the LCD panel, the frame having a display window exposing a display area of the LCD panel, wherein the frame comprises a front frame portion positioned in a first plane, a side frame portion positioned in a second plane, and a chamfer portion positioned in a third plane and being positioned intermediate the front and side frame portions, wherein a width of the chamfer portion is in a range of 2 mm to 6 mm.

7. The LCD of claim 6, wherein a angle between the first plane of the front frame portion and the third plane of the chamfer portion is in a range of 120 degrees to 150 degrees.

8. The LCD of claim 6, wherein the frame is comprised of an alloy of aluminum.

9. The LCD of claim 6, further comprising an accommodating container accommodating a backlight unit, wherein the frame cooperates with the accommodating container.

10. The LCD of claim 6, wherein a ratio of the width of the chamfer portion to a length of a side of the LCD panel is in a range of 0.002 to 0.01.

* * * * *